United States Patent
Davis et al.

(10) Patent No.: US 10,025,569 B2
(45) Date of Patent: Jul. 17, 2018

(54) LINEAR-TIME ALGORITHM TO DETERMINE THE MAXIMUM NUMBER OF ITERATIONS OF THE ITERATIVE ALGORITHM FOR DATA-FLOW ANALYSIS FOR REDUCIBLE LOOPS

(71) Applicant: TEXAS INSTRUMENTS INCORPORATED, Dallas, TX (US)

(72) Inventors: Alan L. Davis, Sugar Land, TX (US); Paul Fuqua, Dallas, TX (US); Timothy John Harvey, Bellaire, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/213,425

(22) Filed: Jul. 19, 2016

(65) Prior Publication Data

US 2018/0024820 A1    Jan. 25, 2018

(51) Int. Cl.
*G06F 9/45*        (2006.01)
*G06F 8/41*        (2018.01)

(52) U.S. Cl.
CPC .............. *G06F 8/433* (2013.01); *G06F 8/443* (2013.01)

(58) Field of Classification Search
None
See application file for complete search history.

(56) References Cited

U.S. PATENT DOCUMENTS

| 2007/0005633 A1* | 1/2007 | Ball ................... G06F 11/3608 |
| 2007/0028227 A1* | 2/2007 | Lebowitz .................. G06F 8/20 |
| | | 717/168 |
| 2008/0120564 A1* | 5/2008 | Balasubramanian . G06F 11/362 |
| | | 715/771 |
| 2008/0127118 A1* | 5/2008 | Kasman .................... G06F 8/67 |
| | | 717/130 |
| 2014/0344803 A1* | 11/2014 | Wang ........................ G06F 8/61 |
| | | 717/178 |
| 2016/0170725 A1* | 6/2016 | Holton .................... G06F 8/433 |
| | | 717/157 |

OTHER PUBLICATIONS

Xie et al., "S-Looper: Automatic Summarization for Multipath String Loops," ACM, 2015.*

(Continued)

*Primary Examiner* — Insun Kang
(74) *Attorney, Agent, or Firm* — Kenneth Liu; Charles A. Brill; Frank D. Cimino

(57) ABSTRACT

A compiler converts a high level language program into a corresponding machine level language program. The compiler forms an initial control flow graph of the high level language program with nodes and edge, the nodes including a starting node, initializing a collapse count to zero, and sets the initial control flow graph as a current control flow graph. The compiler performs iterative collapsing operations on the current control flow graph until only a single node remains. After performing the iterative collapsing operations, data flow analysis is performed on the initial control flow graph for a number of iterations equal to one greater than the collapse count. Then, the machine level language program corresponding to the high level language program is generated based upon the data flow analysis.

15 Claims, 3 Drawing Sheets

(56) References Cited

OTHER PUBLICATIONS

Tok et al, Efficient Flow-Sensitive Interprocedural Data-Flow Analysis in the Presence of Pointers, Springer-Verlag Berlin Heidelberg 2006.*
Cooper et al., Iterative Dataflow Analysis, Revisited, ACM 2002.*
A Strong-Connectivity Algorithm and Its Applications in Data Flow Analysis, M. Sharir, Comp. & Maths. with Appls. vol. 7, pp. 67-72 Pergamon Press Ltd., 1981.

* cited by examiner

LINEAR-TIME ALGORITHM TO DETERMINE THE MAXIMUM NUMBER OF ITERATIONS OF THE ITERATIVE ALGORITHM FOR DATA-FLOW ANALYSIS FOR REDUCIBLE LOOPS

TECHNICAL FIELD OF THE INVENTION

The technical field of this invention is compilers producing machine code for a target data processor from programmable readable code in a high level language.

BACKGROUND OF THE INVENTION

Compilers convert computer programs from a human readable form (high level language) into a machine readable form (machine language) which can be directly used by a computer of a target type. Compilers enable a human operator (programmer) to more easily produce computer program code in the restrictive syntax required by the target computer. The programmer may concentrate on algorithm development at a greater level of abstraction. The compiler performs the task of converting the resulting program in the high level language into the exacting syntax required by the machine language of the target computer type.

Compilers are typically implemented as programs that control a general purpose computer. A compiler typically operates by recalling the high level language program from non-volatile memory, parsing the high level language program, producing a corresponding machine language program and storing the resulting machine language program in non-volatile memory. The resulting machine language program is transferred to an example of the target computer for loading and use.

The step of producing the machine language program typically involves some level of optimization. Even the earliest examples of compilers included optimization techniques. The earliest compilers competed with human programmers that were highly skilled in producing machine language for the target computer. Early compiler users were generally less skilled programmers, or at least less specialized in programming for the target computer. Thus compilers employ optimization to produce better machine language programs from the source high level language program. The resultant better machine language program may operate faster, employ computer resources more efficiently or the like.

Compiler optimization focuses on a variety of improvements such as tracking and using values at compile time, finding better instruction sequences, and moving computation to less expensive places in the code. All of these code transformations require data-flow analysis, defined as compile-time reasoning about the runtime flow of values. There are many kinds of data-flow analysis, each aimed at particular optimizations.

Compiler optimizations typically rely upon the nature of the compiling computer. Programmed computers are much more adept at repetitive and voluminous tasks than a human operator. Compiler optimization employs this adeptness in searching for improved machine language implementations of the source high level language.

Typically a compiler will generate a corresponding machine language program for any input high level program having legal syntax. A high level program is presented in proper syntax to be converted into machine language does not usually use machine resources wisely. Data-flow analysis describes how the high-level-language uses data. The compiler uses this analysis to drive transformations that perform the same function more efficiently on the target machine. For example, the high-level language may declare some piece of data variable, but the actual data use always has a constant value. The machine-language program could better use resources by treating this quantity as a constant rather than a variable.

Data-flow analysis determines whether the source high level language program efficiently uses data. The compiler uses this analysis to drive transformations that perform the same function more effectively on the target machine. The compiler must allocate memory and registers to variables. This allocation must take into account data use. The same resources of memory and registers could be allocated to variables not used together. As another example, the high level language may declare a data variable but the actual data use is of a constant. The machine language program could better use resources by treating this quantity as a constant rather than a variable.

A compiler implementing data-flow analysis typically relies on the iterative algorithm for data-flow analysis. The literature describes the kinds of equations for which this analysis will converge and find a solution that does not change as the known information is considered. Certain compiler optimizations will use equations that do not fit this model. The typically employed iterative algorithm is still applicable, but the answers (usually in the form of sets) may not converge. When the analysis fails to converge, the compiler is conservative and throws away all of the computation including all data on all variables tracked. The upper bound on the number of required iterations before the sets converge or may be expected to not converge is defined by a theoretic characteristic of the control-flow graph of the program called loop connectedness known as d(G). According to the prior art calculating this loop connectedness was believed to require a time corresponding to the exponent of the number of nodes of the control flow graph. Computations of this order are impractical and thus were not attempted in the prior art.

The prior art employed a compromise to deal with this lack of knowledge of the number of loop iterations required for convergence, if convergent is possible. The prior art selects a maximum number of data-flow analysis iterations arbitrarily. Data-flow analysis proceeded until either the arbitrarily chosen maximum number of iterations is reached or convergence is detected. Convergence is determined when no tracked values changed during the prior iteration. If the maximum number of iterations is reached without detecting convergence of all data values, the prior art compiler typically assumed all data of that data-flow analysis is invalid. Such data was discarded. Thus resources employed when reaching the maximum number of iterations without detecting convergence were wasted.

The arbitrarily chosen number of iterations of the prior art has three weaknesses. If the actual number of iterations necessary to show non-convergence is much smaller than the arbitrary limit, the compiler wastes resources on extra, useless computation. If the number of iterations necessary to show non-convergence is only slightly higher than the arbitrarily chosen limit, the compiler discards information that could have been useful if only a little more work had been done. If the compiler could determine the exact number of iterations necessary to prove convergence, the compiler might be able to keep information that had converged, while discarding only the information for variables that had not yet converged. The prior art doesn't know when a computation would have converged, so all information is discarded.

SUMMARY OF THE INVENTION

This invention improves the use of a known compiler optimization known as data-flow analysis. This invention calculates the number of iterations for convergence d(G), if convergence is possible. This permits the data-flow analysis to be run for exactly the number of iterations needed for convergence when convergence is possible and to determine non-convergence when convergence will not happen.

This invention calculates d(G) by parsing the control-flow graph of the program or program module. This parsing operates iteratively. Each iteration detects each node having a backedge into a current starting node. For each such detected node, this invention collapses the control-flow graph including all nodes between the node having the backedge into the current starting node and the current starting node into a new starting node. When only a single node remains, the count of collapses is the number of iterations for convergence d(G).

BRIEF DESCRIPTION OF THE DRAWINGS

These and other aspects of this invention are illustrated in the drawings, in which.

DETAILED DESCRIPTION OF PREFERRED EMBODIMENTS

Figure 1:
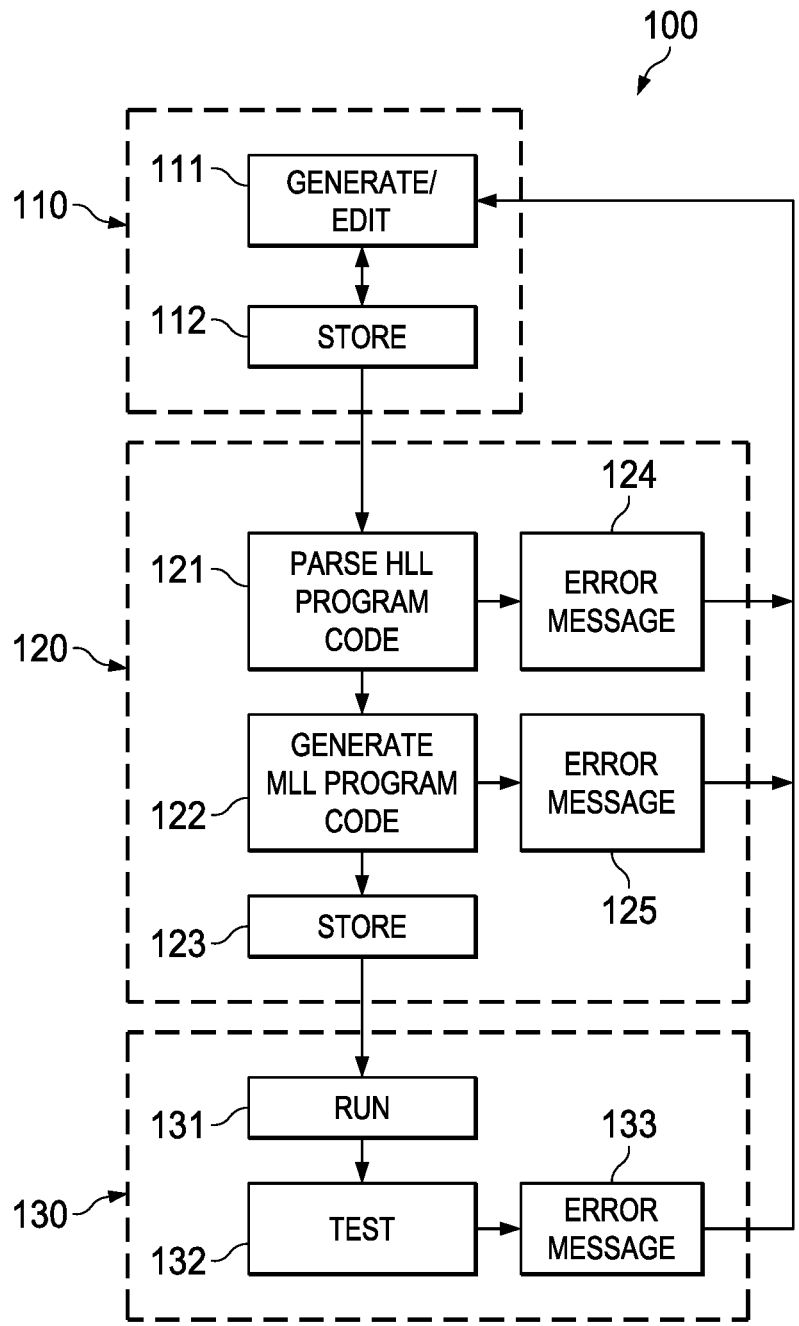
FIG. 1 is a flow diagram for a compiler environment to which this invention is applicable (prior art)

FIG. 1 illustrates a typical compiler environment using this invention. The compiler environment 100 consists of three parts: high level language code generation 110; compiler 120; and machine level language use 130.

High level language code generation 110 produces the human readable high level language program. This is typically produced by a programmer using keyboard and a computer oriented text generator such as generate/edit tool 111. The human operator specifies the high level language program for the desired functionality. Generate/edit tool 111 cooperates with store 112 to store the high level language program. Store 112 is a non-volatile memory which stores the high level language in a non-transitory form. A typical computer used to implement compiler environment 100 will employ a fixed magnetic disk drive (called a hard disk) for this purpose. Other possible storage media are optical disks (CD, DVD or Blueray), removable magnetic disks or non-volatile semiconductor memory (EPROM or FLASH). The high level language produced by the human operator is stored in non-transitory memory that is non-volatile, that is not dependent upon the computer being powered to maintain the storage.

Compiler 120 converts the high level language program into a machine language program suitable for execution on a target computer. Compiler 120 includes parse HLL (high level language) program code block 121. Parse HLL program code block 121 considers and deconstructs the high level language program. This process is used to determine the parameters of the corresponding machine level program to be generated. The iteration determination and the data-flow analysis of this invention occur in parse HLL program code block 121. These will be described in further detail below.

One possible result of this parsing of parse HLL program code block 121 is detection of an error in the high level language program code. At this stage any error detected is most likely a syntax error in the high level language program statements. Generally such a syntax error occurs by not properly specifying the right number and type of arguments for the program statement. This may occur by omission of or misplacement of a comma or parenthesis. Upon detection of such an error, parse HLL program code block 121 passes control to error message block 124. It is known in the art for parse HLL program code block 121 to pass an indication of the nature and location of the error to error message block 124. Error message block 124 then passes control to generate/edit tool 111. Generate/edit tool 111 opens a copy of the corresponding high level program at the program statement generating the error. This could be displayed with an indication of the type of error detected. Thus the human user could edit the high level language program to correct the error, followed by resubmission to compiler 120.

Assuming the parse HLL program code block 121 detects no errors, then control flow proceeds to generate MLL (machine level language) code block 123. Generate MLL code block 123 produces a machine level language program corresponding to the human produced high level language program. This generation function preferably depends upon characteristics of the high level language program determined by parse HLL program code block 121. Generate MLL code block 123 may detect errors which are handled by error message block 125 in a manner previously described with respect to error message block 124.

Assuming the generate MLL program code block 121 detects no errors, then control flow proceeds to store 123. Store 123 stores the MLL program code in non-volatile memory in a non-transitory form as previously described with respect to store 112.

The final stage of compiler environment 100 is machine level language use block 130. Machine level language use block 130 runs the thus generated machine level program on an exemplar of the target computer (run block 131). In some cases the computer executing the compiler environment program is an example of the target computer. In that case the MLL program code is run on that computer by recall from storage (store 123). The MLL program code could be stored in the same memory type as the HLL program code. In other cases the computer executing the compiler environment program is not of the target type. In that case the MLL program code must be transmitted to an exemplar of the target computer type. This may involve transportation of a memory media carrier between computers or data transmission of the MLL program between computers.

Compiler environment 100 includes test block 132. Test block 132 tests the operation of the MLL program to determine if it operates as intended. Test block 132 might be an automated operation comparing results from executing the MLL program to an expected result. Test block 132 may be mediated by a human operator. Lastly, test block 132 might be a combination of these techniques. Upon detection of an error, test block 132 passes control flow to error message block 133. In the case of an automated or partially automated test block 132, error message block 133 may receive an indication of the type and source of the error. Control flow then proceeds to generate/edit tool 111. As noted above, the human user edits the high level language program to correct the error, followed by resubmission to compiler 120.

Figure 2:
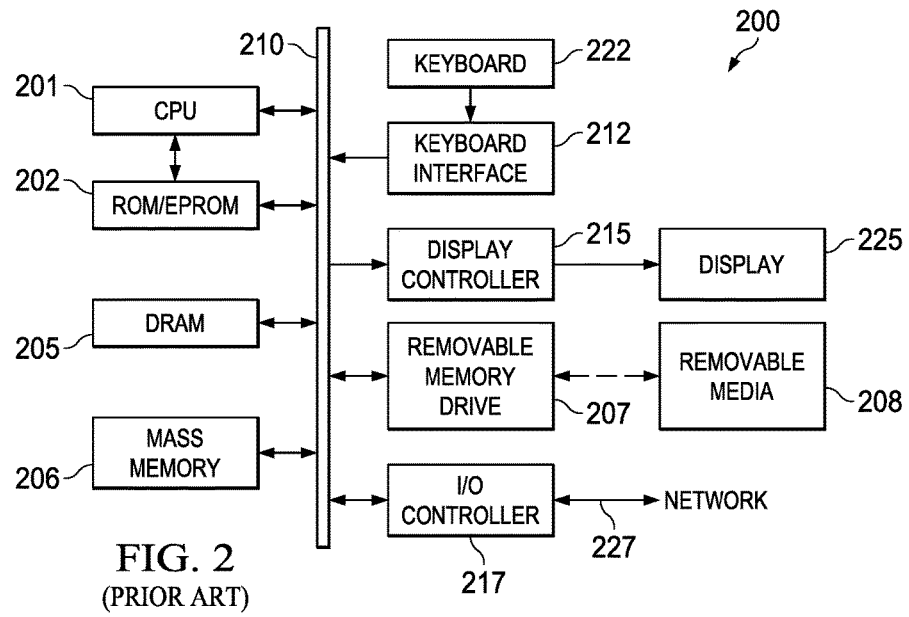
FIG. 2 is a block diagram illustrating an embodiment of a data processing system to which this invention is applicable (prior art)

FIG 2 illustrates a block diagram of a digital computer system 200. Computer system 200 is of the type suitable to execute a compiler including this invention. Computer system 200 includes components: central processing unit (CPU) 201; ROM/EPROM 202 or other nonvolatile memory such as FLASH; DRAM (Dynamic Random Access Memory) 205; mass memory 206; removable memory drive 207 removably connectable to removable media 208; system bus 210; keyboard interface 212; keyboard 222; display controller 215; display 225; and I/O controller 217 connected to network 227.

CPU 201 acts as the controller of computer system 200 giving the system its character. CPU 201 operates according to programs initially stored in ROM/EPROM 202 and mass memory 206. Read only memory (ROM) is fixed upon manufacture. Erasable programmable read only memory (EPROM) may be changed following manufacture even in the hand of the consumer in the field. Suitable programs in ROM/EPROM 202 include the user interaction programs, which are how the system responds to inputs from keyboard 222 and displays information on display 225, the manner of fetching and controlling files from mass memory 206, removable memory drive 207, interaction with the network 227 via I/O controller 217 and the like. A typical system may include both ROM and EPROM. Programs generic to operation of computer system 200 may be stored in ROM/EPROM 202. Programs more directed to the particular use of an instance of computer system 200 will typically be stored in mass memory 206. Temporary copies of controlling programs and operational data are stored in DRAM 205.

DRAM 205 provides the major volatile data storage for the system. This may include the machine state as controlled by CPU 201. Typically data is recalled from mass memory 206 or received from network 227 via I/O controller 217, and buffered in DRAM 205 before use by CPU 201. DRAM 205 may also be used to store intermediate results of calculations.

Mass memory 206 moves data to system bus 210 under control of CPU 101. This data movement would enable recall of computer programs or data from mass memory 206 for presentation to the user. In this regard, the HLL program code and the MLL program code are treated as data.

System bus 210 serves as the backbone of computer system 200. Major data movement within computer system 200 occurs via system bus 210.

Keyboard interface 212 mediates user input from keyboard 222. Keyboard 222 typically includes key switches for user input. Keyboard interface 212 senses operation of these key switches from keyboard 222 and signals CPU 201 of the user input. Keyboard interface 212 typically encodes key touch in a code that can be read by CPU 201. Keyboard interface 212 may signal a user input by transmitting an interrupt to CPU 201 via an interrupt line (not shown). CPU 201 can then read the input key code and take appropriate action.

Display controller 215 controls the display shown to the user via display 225. Display controller 215 receives data from CPU 201 via system bus 110 to control the display. Display 225 is typically a multiline cathode ray tube (CRT) or liquid crystal display (LCD). This display typically may also be used to facilitate input and editing of program statements via generate/edit tool 111.

I/O controller 217 enables computer system 200 to exchange messages and data with network 227. As an example, I/O controller 217 could permit computer system 200 to transfer a generated MLL program to a target computer via network 227.

This invention calculates a value for the loop connectedness, herein designated as d(G), of a program or program module. This value d(G) is the number of data-flow analysis iterations through the control flow graph of the program before convergence if convergence is possible. The value d(G) is dependent upon the connectivity G of the control flow graph (CFG) of the program. Prior to this invention it was believed calculation of d(G) was impractical as too difficult or lengthy. Thus in the prior art d(G) was not computed but merely estimated. The prior art typically employed an iterative data-flow analysis algorithm which ran until no data corresponding to any tracked variable changes, indicating convergence, or the maximum estimated d(G) is reached. This invention enables computation of an exact upper bound on the number of iterations of the iterative algorithm. The computation of this invention is generally linear to the number of nodes and connections in the control flow graph.

Data-flow analysis determines the use of data variables in the HLL program code. The compiler produces a MLL program from the HLL program with variable use optimized according the data-flow analysis. This process begins by production of a control flow graph of the original HLL program or program module. A control flow graph outlines the control structure of the original HLL program. A computer program is a listing of computer processes to be performed. A key feature is conditional branching, where the control flow may take differing paths based upon measured criteria. A typical computer process conditionally branches based upon a data condition. For real-time control processes the criteria may be a measured environmental condition. As an example, a thermostat program may include a process "Turn on furnace if measured temperature is below X°." Other computer programs may perform different actions dependent upon the nature of the data being processed. As an example, a video compression program may process a video frame differently based upon the frame data.

Figure 3:
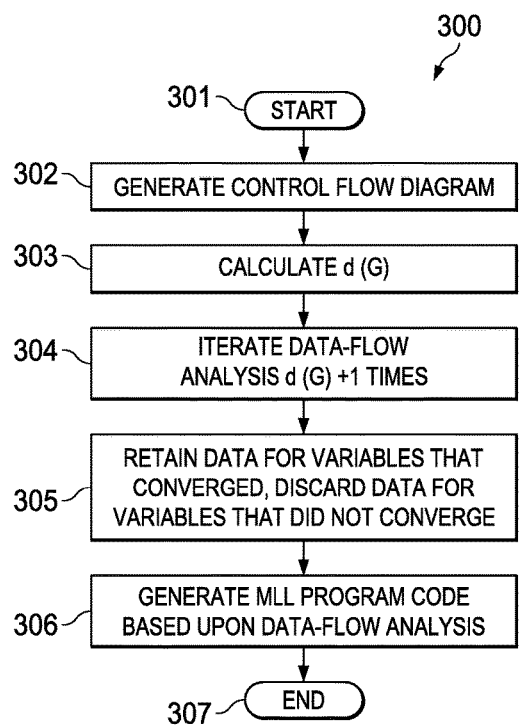
FIG. 3 is a flow diagram of the compiler process of this invention.

FIG. 3 is a flow diagram of the process of this invention in the context of a compiler 300. Compiler 300 begins with start block 301. Start block 301 includes powering up the computer performing the compiler task (such as computer 200 illustrated in FIG. 2), starting the compiler program and preliminary tasks of the compiler. These preliminary tasks include specification of the human readable high level language program, recall of this program from non-volatile memory such as mass memory 206. Start block 301 also includes the known process of selection of compiler options which control parameters of the resultant machine language program. As previously noted the computer performing the compile may be the same as the target computer for the machine language program or may differ.

Block 302 generates a control flow graph of the original human readable high level language program. One advantage of computer facilitated processing is the use of conditional branches. Typical computer control flow is linear from one instruction to the next instruction in sequence. A branch instruction interrupts this linear flow causing control to pass to different instruction than the next in sequence. A conditional branch instruction creates control flow deviations dependent upon conditions experienced by the program. Typically the control flow is directed to one of two next instructions based upon the relationship between a data value or a measured environmental condition and a set point. A typical conditional branch instruction is in the form:

IF (Statement): THEN (First Address)
ELSE (Second Address)

The computer evaluates the Statement determining whether it is true or false. Statement must be in a form that can be determined to be true or false. If Statement is true, program control flow proceeds to First Address. If Statement is false, program control flow proceeds to Second Address. Such an IF: THEN instruction is sometimes presented in a form without an explicit ELSE and Second Address. In that form program control flow proceeds to the next sequential instruction following the IF: THEN instruction if Statement is false.

Figure 4:
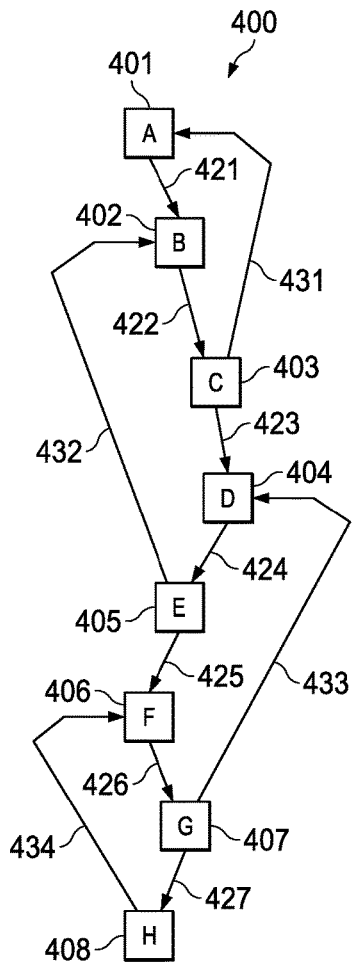
FIGS. 4 to 8 illustrate the process of computation of d(G) for an example control flow graph.

The control flow graph formed in block 302 includes: nodes where data processing occurs; and edges which connect the nodes. FIG. 4 illustrates a simplified example control flow graph 400 used to explain the determination of d(G) of this invention. Control flow graph 400 includes nodes 401, 402, 403, 404, 405, 406, 407 and 408. As illustrated in FIG. 4, each node 401, 402, 403, 404, 405, 406, 407 and 408 includes an alphabetic symbol (A, B, C . . . ) which represents the data manipulation of variables within the node. Control flow graph 400 includes forward edges 421, 422, 423, 424, 425, 426 and 417 and backward edges 431, 432, 433 and 434. Generation of a control flow graph from an input high level program is known in the art and will not be further described.

Block 303 computes the value d(G) of the program to be compiled. Below is pseudo-code for a linear-time algorithm to determine a tight upper bound of iterations d(g) for a control flow graph that contains only single-dominator strongly connected components (SCCs). An SCC is a single-dominator SCC if it contains a node that dominates all other nodes in the SCC. The below pseudo-code operates on a control flow graph (CFG) made up of a set of nodes N, edges E, and a unique start node S0. This pseudo-code finds all of the maximal strongly connected components (SCCs) of the graph. These are denoted as the set of {n, e, s0}: where n is a subset of N; e is a subset of E; and s0 is the node in the SCC that dominates all of the other nodes in n. Finding the SCCs can be done with the classic algorithm by Tarjan, which requires time that scales linearly with the number of edges E and also finds the set of edges in e that are backedges.

```
scc (G)                        // input set of all
                                  maximal sccs
  for each g (n, e, s0) in scc (G)  // "for each maximal scc,
                                      g, in G . . . "
    iterations_needed = 1      // initialization pass
                                  which counts as the
                                  first pass
    while (number of nodes in g > 1)
      for each block in backedges_into (s0)
        g (n', e', s0)           // collapse into s0 all
                                    nodes between block
                                    and s0 to create a
                                    smaller g
      iterations_needed++
      if (iterations_needed > maximum_found)
        maximum_found = iterations_needed
  return maximum_found
```

The collapse subroutine groups sets of nodes that conceptually share information. The collapse subroutine combines sets of nodes into the header node to create a new header node by walking backwards up the CFG from the source of each backedge to the header node. For each backedge into the header node, the subroutine walks up the CFG from the source of the backedge up to the header, combining all of the nodes in this path into a new, collective header node.

```
given: head, the header of the scc
for all backedges, be, into head
  walk_up_from (be->source, head)
  // this collapses (groups) blocks in the SCC into the header
  // node (here the parameter called block_to_stop_at)
  walk_up_from (current, block_to_stop_at)
    add current to the set block_to_stop_at
    for all predecessors, pred, of current
      if pred is already in block_to_stop_at
        continue
      if (current, pred) is a backedge
        // ignore backedges when collapsing
        continue
      else
        walk_up_from (pred, block_to_stop_at)
```

The technique of reducing groups of nodes into a single node is known in the art. This technique is described for our exact problem in "A strong-connectivity algorithm and its applications in data flow analysis," by M. Sharir. Sharir was trying to solve a different problem, and did not recognize that this algorithm has the use presented here.

Figure 5:
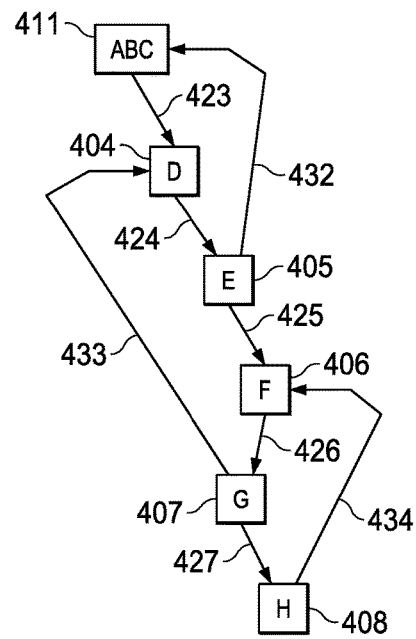

FIGS 4 to 8 illustrate an example of this process on control flow graph 400. FIG. 4 illustrates a simplified example original control flow graph 400. A first iteration finds a single backedge 431 into node 401 from node 403. Following up the graph from the source of that backedge (node 403) to node 401, traverses node 403, node 402 and node 401. The collapse subroutine collapses nodes 403, 402 and 401 into node 411 (FIG. 5). The collapse subroutine collapses C and B into A. This results in node 411 illustrated in FIG. 5. Node 411 includes the data processing ABC from each of the collapsed nodes 401, 402 and 403.

Figure 6:
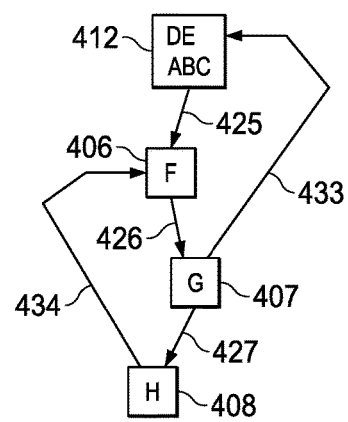

The next iteration (FIG. 5) finds backedge 432 into node 411 from node 405. Following up the graph from the source of that backedge (node 405) to node 411, traverses node 405, node 404 and node 411. The collapse subroutine collapses nodes 405, 404 and 411 into node 412 (FIG. 6). The collapse subroutine collapses D and E into ABC. This results in node 412 illustrated in FIG. 6. Node 412 includes the data processing DE ABC from each of the collapsed nodes 404, 405 and 411.

Figure 7:
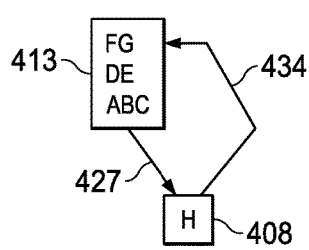

A next iteration (FIG. 6) finds backedge 433 into node 412 from node 407. Following up the graph from the source of that backedge (node 407) to node 412, traverses node 407, node 406 and node 412. The collapse subroutine collapses nodes 407, 406 and 412 into node 413 (FIG. 7). The collapse subroutine collapses F and G into DE ABC. This results in node 413 illustrated in FIG. 7. Node 413 includes the data processing FG DE ABC from each of the collapsed nodes 407, 406 and 412.

Figure 8:
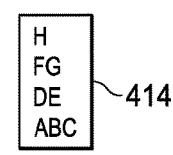

A final iteration (FIG. 7) in this example finds backedge 434 into node 413 from node 408. Following up the graph from the source of that backedge (node 408) to node 413, traverses node 408 and node 413. The collapse subroutine collapses nodes 408 and 413 into node 414 (FIG. 8). The collapse subroutine collapses H into FG DE ABC. This results in node 414 illustrated in FIG. 4. Node 414 includes the data processing H FG DE ABC from each of the collapsed nodes 408 and 413.

The processing of control flow graph 400 takes four iterations and yields a d(G) of four. Following determination of d(G), block 304 iterates the data-flow analysis d(G)+1 number of times. This data flow analysis is a known process.

There may be data for some variables that converge and data for other variables that do not converge. According to the invention data for a variable that changes from the d(G)-th iteration to the (d(G)+1)-th iteration will never converge. Data that does not change between iterations up to the (d(G)+1)-th iteration converges. This process includes identification of variables within the program or module. Many HLL require specific identification of any variables employed, making the required compiler identification trivial. Even for HLL that do not require specific identification of variables, this identification is a known process.

In block 305 data for variables that converge are retained and data for variables that do not converge are discarded. This is in contrast to the prior art which generally discarded all data for all variables if the data for any variable did not converge within the arbitrarily selected maximum number of data flow analysis iterations.

The use of Sharir's process in conjunction with the invention is briefly described for completeness. Typically to compute the data-flow analysis over G, the compiler first reduces G to a smaller graph by collapsing each SCC into a single node yielding a new acyclic graph, $G_{scc}$. The compiler walks over this graph in reverse postorder. At each node, if it is a single basic block (i.e., not an SCC), the process computes the data-flow analysis for that block. If the node is an SCC, the process iterates over the blocks in the SCC in reverse postorder, following the classical iterative algorithm repeating d(G) iterations.

```
for each node, N, in a reverse-postorder walk over G_SCC
    if (N is an SCC)
        iterations = 0
        changed = true
        while iterations < iterations_needed [N] && changed
            iterations++
            changed = false
            for each node N_SCC from N in reverse postorder
                compute data flow for N_SCC, set changed if
                    necessary
    else
        compute data flow for N
```

Block 306 produces a machine level language version of the program based upon the thus formed data-flow analysis employing the variable data retained in block 304. This process is in accordance with the prior art and will not be further described. As an example, some instructions may be moved relative to other instructions to more advantageous positions within the program dependent upon the results of data-flow analysis.

Compiler 300 ends with end block 307. End block 307 includes storing the resultant machine language program in non-volatile memory for use by the target computer. This process would typically be into mass memory 206. This machine language program is then transmitted to a computer of the target type. Such transmission may be via a network, such as network 227 illustrated in FIG. 2, or may be by storage on removable media 208 which is transported to the target computer. The target computer may run the machine language program directly from the removable media 208 or may store the program in a local mass memory before running. Running the compiled program on a computer of the target type completes the process. As noted above, the same computer may run the compiler and be the target computer of the compiler. In this event, saving the machine language program may be into mass memory 206.

This invention computes a tight upper bound on the number of iterations in the iterative algorithm. This invention is advantageous because this calculation is in linear time. That is, the magnitude of the calculation corresponds linearly to the number of nodes or edges in the control flow graph of the source high level language program.

The prior art employed a compromise to deal with the lack of knowledge of the number of loop iterations required for convergence. The prior art selected a maximum number of data-flow analysis iterations relatively arbitrarily. Data-flow analysis proceeded for either the maximum number of iterations or until convergence as indicated no values changed during the prior iteration. Resources employed when reaching the maximum number of iterations without detecting convergence were always wasted. If the data-flow analysis would have converged for more iterations than the arbitrarily selected maximum number of data-flow analysis iterations, the prior art iterations before convergence are wasted. This invention enables determination of the exact number of needed data-flow analysis iterations. For non-converging computations, this invention allows the compiler to determine that some of its analysis is valid, while the rest must be discarded.

What is claimed is:

1. A method for compiling a high level language (HLL) program into a machine level language (MLL) program readable by a target computer, the method comprising:
    forming an initial control flow graph of the HLL program, the initial control flow graph including nodes and edge, the nodes including a starting node;
    initializing a collapse count to zero;
    setting the initial control flow graph as a current control flow graph;
    performing iterative collapsing operations on the current control flow graph until only a single node remains, wherein each iteration of the iterative collapsing operations includes:
        detecting each node in the current control flow graph that has a backedge into a current starting node;
        for each detected node, performing a collapsing operation in which all nodes of the current control flow graph between the detected node and the current starting node are collapsed into a new starting node;
        incrementing the collapse count by one for each collapsing operation;
        updating the current control flow graph to include the new starting node; and
        if the updated control flow graph includes more than one node, setting the new starting node as the current starting node and the updated control flow graph as the current control flow graph;
    after performing the iterative collapsing operations, performing data flow analysis on the initial control flow graph for a number of iterations equal to one greater than the collapse count; and
    generating the MLL program corresponding to the HLL program based upon the data flow analysis.

2. The method of claim 1, further comprising:
    identifying variables within the HLL program; and
    wherein performing the data flow analysis on the initial control flow graph operates separately for each identified variable, retains data corresponding to a variable for which the data flow analysis converges, and discards data corresponding to a variable for which the data flow analysis does not converge.

3. The method of claim 2, wherein performing the data flow analysis over the initial control flow graph includes:

determining that a first variable converges if data corresponding to the first variable does not change between iterations of the data flow analysis; and determining that a second variable does not converge if data corresponding to the second variable changes between a next to last iteration of the data flow analysis and a last iteration of the data flow analysis.

4. The method of claim 1, further comprising recalling the HLL program from a non-volatile memory.

5. The method of claim 4, further comprising:
transmitting the MLL program to the target computer; and
running the MLL program on the target computer.

6. The method of claim 5, wherein transmitting the MLL program to target computer includes:
storing the MLL program on non-volatile media;
conveying the non-volatile media to target computer; and
recalling the MLL program from the non-volatile media.

7. The method of claim 1, further comprising storing the MLL program into a non-volatile memory.

8. The method of claim 1, wherein the initial control flow graph comprises a plurality of strongly connected components (SCCs).

9. A tangible and non-transitory data storage media having instructions stored thereon that, when executed by a processor of a computing device, cause the computing device to compile a high level language (HLL) program into a machine level language (MLL) program readable by a target computer by:
forming an initial control flow graph of the HLL program, wherein the initial control flow graph including nodes and edge, and the nodes including a starting node;
setting the initial control flow graph as a current control flow graph;
initializing a collapse count to zero;
performing iterative collapsing operations on the current control flow graph until only a single node remains, wherein each iteration of the iterative collapsing operations includes:
detecting each node in the current control flow graph that has a backedge into a current starting node;
for each detected node, performing a collapsing operation in which all nodes of the current control flow graph between the detected node and the current starting node are collapsed into a new starting node;
incrementing the collapse count by one for each collapsing operation;
updating the current control flow graph to include the new starting node; and
if the updated control flow graph includes more than one node, setting the new starting node as the current starting node and the updated control flow graph as the current control flow graph;
performing data flow analysis on the initial control flow graph for a number of iterations equal to one greater than the collapse count after the performance of the iterative collapsing operations; and
generating the MLL program corresponding to the HLL program based upon the data flow analysis.

10. The tangible and non-transitory data storage media of claim 9, wherein the instructions, when executed by the processor, further cause the computing device to identify variables within the HLL program, and wherein performing the data flow analysis on the initial control flow graph operates separately for each identified variable, retains data corresponding to a variable for which the data flow analysis converges, and discards data corresponding to a variable for which the data flow analysis does not converge.

11. The tangible and non-transitory data storage media of claim 10, wherein the instructions that, when executed by the processor, cause the computing device to perform the data flow analysis include instructions to:
determine that a first variable converges if data corresponding to the first variable does not change between iterations of the data flow analysis; and
determine that a second variable does not converge if data corresponding to the second variable changes between a next to last iteration of the data flow analysis and a last iteration of the data flow analysis.

12. The tangible and non-transitory data storage media of claim 9, wherein the instructions, when executed by the processor, further cause the computing device to recall the HLL program from a non-volatile memory of the computing device.

13. The tangible and non-transitory data storage media of claim 12, wherein the instructions, when executed by the processor, further cause the computing device to:
transmit the MLL program to the target computer; and
instruct the target computer to run the MLL program.

14. The tangible and non-transitory data storage media of claim 9, wherein the instructions, when executed by the processor, further cause the computing device to store the MLL program into a non-volatile memory of the computing device.

15. The tangible and non-transitory data storage media of claim 9, wherein the initial control flow graph of the HLL program includes a plurality of strongly connected components (SCCs).

* * * * *